(12) United States Patent
O'Hagan

(10) Patent No.: US 11,300,095 B2
(45) Date of Patent: *Apr. 12, 2022

(54) WIND TURBINE SUITABLE FOR MOUNTING WITHOUT A WIND TURBINE TOWER

(71) Applicant: Peter K. O'Hagan, Hamilton (CA)

(72) Inventor: Peter K. O'Hagan, Hamilton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,276

(22) Filed: Apr. 9, 2020

(65) Prior Publication Data

US 2020/0248670 A1 Aug. 6, 2020

Related U.S. Application Data

(63) Continuation-in-part of application No. 15/558,541, filed on Sep. 14, 2017, now Pat. No. 10,648,450.

(51) Int. Cl.
*F03D 1/06* (2006.01)
*F03D 1/04* (2006.01)
(Continued)

(52) U.S. Cl.
CPC .............. *F03D 1/0633* (2013.01); *F03D 1/04* (2013.01); *F03D 1/0625* (2013.01); *F03D 7/02* (2013.01); *F03D 7/0204* (2013.01); *F03D 9/12* (2016.05); *F03D 9/25* (2016.05); *F03D 15/00* (2016.05); *F05B 2240/133* (2013.01); *F05B 2250/25* (2013.01); *F05B 2270/32* (2013.01);
(Continued)

(58) Field of Classification Search
CPC . F03D 1/0633; F03D 9/12; F03D 9/25; F03D 1/04; F03D 1/0625; F03D 7/02; F03D 15/00; F03D 7/0204; F05B 2240/133; F05B 2250/25; F05B 2270/32; F05B 2270/321; F05D 2240/40; Y02B 10/30; Y02E 10/72; Y02E 60/16
See application file for complete search history.

(56) References Cited

U.S. PATENT DOCUMENTS 4,140,433 A * 2/1979 Eckel .................... F03D 1/0658
 415/209.1
4,464,579 A * 8/1984 Schwarz ................. F03D 7/026
 290/44

(Continued)

FOREIGN PATENT DOCUMENTS

CA 2590918 A1 6/2006

*Primary Examiner* — Viet P Nguyen
(74) *Attorney, Agent, or Firm* — Toussaint L. Myricks

(57) ABSTRACT

This invention discloses an improved wind turbine suitable for mounting without a wind turbine tower. The wind turbine is based on a rotor with appropriately selected blades. A nozzle and diffuser in the wind flow increase the amount of wind energy available to the rotor. The rotor is interruptibly connected with one or more of a plurality of generators which allows generation at a wide range of wind speeds. The rotor is also interruptibly connected with a co-axial flywheel which allows for storage or use of rotational energy as needed by the availability of wind energy. One or more wind turbines can be grouped together in a common housing. Electricity can also be generated by means of stored energy. The lack of a wind turbine tower and the general compact design allows the wind turbine to be used in close proximity to or on buildings.

19 Claims, 13 Drawing Sheets

(51) Int. Cl.
  *F03D 9/25* (2016.01)
  *F03D 7/02* (2006.01)
  *F03D 9/12* (2016.01)
  *F03D 15/00* (2016.01)

(52) U.S. Cl.
  CPC .... *F05B 2270/321* (2013.01); *F05D 2240/40* (2013.01); *Y02B 10/30* (2013.01); *Y02E 10/72* (2013.01); *Y02E 60/16* (2013.01)

(56) References Cited

U.S. PATENT DOCUMENTS

| | | | | |
|---|---|---|---|---|
| 6,984,899 B1* | 1/2006 | Rice | ............ | F03D 15/10 290/44 |
| 8,502,403 B2* | 8/2013 | Merswolke | ............ | F03D 7/0276 290/44 |
| 10,648,450 B2* | 5/2020 | O'Hagan | ............ | F03D 1/04 |
| 2003/0133783 A1 | 7/2003 | Brock et al. | | |
| 2006/0002786 A1* | 1/2006 | Richter | ............ | F03D 1/04 415/4.5 |
| 2006/0026954 A1* | 2/2006 | Truong | ............ | F03D 3/02 60/398 |
| 2010/0150718 A1* | 6/2010 | Freda | ............ | F03D 1/02 416/120 |
| 2010/0270800 A1* | 10/2010 | Krietzman | ............ | F03D 9/12 290/44 |
| 2010/0320771 A1* | 12/2010 | Urch | ............ | F03B 17/061 290/55 |
| 2011/0204634 A1* | 8/2011 | Skala | ............ | H02K 7/183 290/44 |
| 2012/0038157 A1* | 2/2012 | Skala | ............ | F03D 1/04 290/44 |
| 2013/0043679 A1* | 2/2013 | Nomoto | ............ | F03D 9/12 290/44 |

* cited by examiner

WIND TURBINE SUITABLE FOR MOUNTING WITHOUT A WIND TURBINE TOWER

CROSS-REFERENCE TO RELATED APPLICATION

This application is a Continuation-In-Part of U.S. patent application Ser. No. 15/558,541, filed Sep. 14, 2017, which is hereby incorporated by reference in its entirety.

FIELD OF THE INVENTION

This patent disclosure relates to wind turbines that increase air flow through the use of nozzles and diffusers and that are suitable for mounting without a wind turbine tower.

BACKGROUND OF THE INVENTION

Wind turbines are well known as means of converting the kinetic energy of the wind into mechanical energy by the turning of rotor blades. In turn, the mechanical energy can then be converted into electrical energy by means of an electrical generator.

One type of a wind turbine used for electricity generation is comprised of a rotor with a multiplicity of long slender blades connected to a common spindle situated on the top of a suitably sized tower. An illustration of this type can be found in FIG. 1 of U.S. Pat. No. 8,622,698. Challenges faced in practice with this type of wind turbine are inefficiency at low wind speeds, the height of the towers and blades—required for safety and efficiency—and the overall intrusive appearance of such large structures. U.S. Pat. No. 8,622,698 also illustrates the common wind turbine tower used in practice: a slender, tall single element support.

In part, the efficiency of a wind turbine is predicted by Betz's Law. This law predicts that a wind turbine can only capture less than $16/27$ (59.3%) of the kinetic energy of the wind. The limit arises as a result of the collision of air molecules that transfer their energy to the rotor blades.

In practice, wind turbines can only capture about 75 to 80% of the Betz's Law limit. However, a means of achieving higher efficiencies is to collect additional wind flow by the use of nozzles and diffusers before and after the rotor. The challenge is more fully described in US20120175882.

Many wind turbines with shrouds or cowlings to create nozzles and diffusers are known in the art. One example is found at WO2012137008. Another is found at WO2006065248. An earlier type of wind turbine shroud specified for use on a tower structure is found at U.S. Pat. No. 4,075,500. However, in practice, the weight and wind load of the shrouds prove to be difficult to mount on wind turbine towers.

Other short-comings of wind turbines are described in US2012282092 starting at paragraph 0014. These include: inefficient operation close to the ground; large dimensions required by towers; expensive maintenance and cyclic stresses and failures.

One type of inefficiency in wind turbines is created by the wind currents which are created at the tips of blades. One means of solving this problem is to enclose the blades in a structure whereby there are no such currents. Such an arrangement is found in CA2590918 (at FIG. 3). In this patent, the drum also acts as a part of the electrical generator.

It would be beneficial if a wind turbine could be designed that would be efficient at lower wind speeds, could be installed without the use of the common wind turbine tower and could generally overcome the previously known shortcomings of wind turbines in general. CA2590918 previously referred to teaches that a cowled turbine can be installed at the top of a wind turbine tower. CA25090918 also teaches the use of a fin to passively steer the turbine into the wind.

U.S. Pat. No. 4,140,433 teaches the elimination of the wind turbine mast. However, similar to CA2590918, U.S. Pat. No. 4,140,433 teaches only the use of a freely-rotatable turntable to ensure the turbine turns into the wind and the additional use of tail fins (Column 9, line 5) to ensure that the turbine self-centers in the wind.

Another short-coming of turbine design is the use of a single generator operating coaxially with or driven by the central shaft of the rotor of the turbine. Such a placement requires that the turbine be shut down for generator maintenance or repair. In addition, placement of the generator at the central shaft of the rotor generally involves difficult access in tight quarters. CA2590918 previously referred to, teaches the optional use of one generator driven by the circumference of the rotor (FIG. 5) but does not teach the use of a mechanical interruption or the use of more than one generator.

The use of only one generator in wind turbines limits their ability to efficiently generate electricity over a wide range of wind speeds. A generator sized for average expected wind speeds is generally inefficient at lower air speeds causing the wind turbine to be idled in such conditions.

A challenge with electricity generation is the losses of electricity in the transmission and distribution system. Significant amounts of electricity are lost in the simple transmission of electricity from one place to another. Because of this challenge, it is desirable that generation systems be placed close to where electricity will be used. The present invention allows generation capacity to be placed in close proximity to or, in suitable cases, on, buildings eliminating transmission losses.

A final challenge with systems related to electricity is the difficulty in storing excess electricity and smoothing out fluctuations in the electricity source. This challenge is pronounced when using wind to power electricity generators due to natural fluctuations in the wind. One means of solving this problem is by the use of flywheels and clutches as found in U.S. Pat. No. 8,749,083. However, the system proposed therein suffers the challenge of having to mount a heavy flywheel at the top of a wind turbine tower.

Liquids such as water may have flows similar to gasses such as air. A short-coming of the designs of most wind turbines is the inability to adapt those designs to areas of natural water flow in order to generate electricity.

SUMMARY OF THE INVENTION

It is an object of this invention to overcome limitations of the prior art in increasing the wind speed through the device.

It is another object of this invention to improve the efficiency of electricity generation by providing for a connection between the rotor and one or more of a plurality of electrical generators on the circumference of the rotor as appropriate for the velocity through the rotor.

It is another object of this invention to create a means of storing excess electricity by mechanical or other means and to allow such excess capacity to be used as required.

It is another object of this invention to create a compact device which may be easily mounted horizontally or vertically and used in any location including on the roofs of buildings.

It is another object of this invention to enable the use of one or more devices according to the present invention in the same installation.

This patent describes a device which, in one embodiment, uses a central drum-style rotor in which the wind-driven blades are affixed. The use of a drum-style rotor allows the blades be fixed on the outside or circumference of their motion eliminating the vortices that develop in more conventional wind turbines.

The use of a drum-style rotor also allows many different types and dispositions of blades to be used. The two principle types of blades that can be used are screw and fan blades.

A screw blade is a helical flange with the width of the flange being roughly equal to the radius of the rotor. The flange is connected on its outside end to the rotor following the path of a helix. The central side of the flange can be loose or optionally connected to a spindle co-axial with the rotor. If more than one screw blade is used, the screw blades are proportionally located within and co-axial with the rotor. In the event of an even number of flanges opposite sided flanges will trace out a helicoid shape with opposite flanges actually being one piece.

The helix of the screw blade can be right- or left-handed and will have a pitch described as the distance between the points where the helix has made one complete turn. In addition, the flange can be connected to the rotor at various angles. The handedness, the pitch, the rotor-connection angle and the position within the rotor of the screw blade may be determined by experimentation and optimized for a particular combination of rotor sizes and wind speeds.

A fan blade is a plurality of blades about a central axis co-axial with the rotor. The blades are connected at their distal ends with the rotor and at their central ends with each other or with an optional spindle. The shape, sizes, angles and design of the fan blades and their location within the rotor may be determined by experimentation and optimized for a particular combination of rotor sizes and wind speeds.

Other types of rotors can be used in the present invention. For example, a central spindle can be provided for to which appropriately sized fans or blades are affixed. Appropriate hubs can be affixed to the central spindle as required.

Nozzles to concentrate the wind can be placed before the rotor to increase the flow of incoming air. In similar fashion, diffusers can be placed behind the rotor in order to drop the pressure of the exiting air. Both techniques are useful in order to increase the ability of the device to generate electricity in low wind velocity situations.

Nozzles and diffusers can be fashioned through the use of appropriately shaped cowlings. Intake cowlings concentrate wind to create a nozzle for intake airflow. Exit cowlings create low pressure zones to act as diffusers for output airflow.

Another means of increasing the wind velocity on the rotor is to use a reverse conical spindle. Such a spindle will increase the venturi effect present within the rotor. The actual location of such a spindle would take the disposition of the blades to be used into account as well as any nozzle or diffuser being used.

The rotor rotates freely about its axis. Such a free rotation can be accomplished with traditional bearing rings at two or more places around the rotor. Alternately, less friction-prone bearing systems such as air bearings or magnetic bearings can be used and are well known in the art.

The device can be turned by a suitably-sized motor driven turntable which is well known in the art. Anemometers to measure direction and speed of wind and control circuitry well known in the art are used to determine the direction required. Unlike traditional turntables used with wind turbines, which rotate freely and may be directed into the wind using passive methods such as fins, this allows the device to be turned both into and away from the wind through controlled means as required by prevailing wind conditions.

The drum-style rotor of the present invention presents a number of different means by which electrical generators can be mechanically connected. Preferably, a plurality of generators is used with mechanical means to individually connect each generator to the circumference of the rotor. Because the mechanical connection of a generator creates a load for the rotor, in low wind situations, it is desirable to only have one or more generators mechanically connected with the rotor to operate at the generator's highest efficiency given the lower wind speed. At high wind loads, more generators can be mechanically connected to the circumference of the rotor to take advantage of the higher energy present in the system. Means to mechanically interrupt the connection of generators with the rotor and to control the same are well known in the art.

In addition to one or more electrical generators, the present invention can use such electrical generators in reverse as drivers. The said drivers can use electrical energy to rotate the rotor to bring it up to operational speeds when first activated. Alternately, drivers can be used to store surplus electrical energy in the rotor or in the coaxial flywheel.

In the present invention the generators which are connected to the circumference of the rotor can be easily serviced or maintained without stopping the entire device. The generator to be serviced or maintained can be disconnected from the circumference of the rotor and then easily removed by an overhead crane as required.

The device can have a co-axial flywheel with the rotor. The flywheel can be connected to the rotor and generators with clutches and gearing in order to store the motion of the rotor in the flywheel or alternately to have the flywheel power the generators. It is also possible, at times of electrical energy surplus, to operate the system in reverse by having the generators act as drivers which in turn transfer energy to the flywheel.

The means to connect and transfer the motion of the flywheel to and from the rotor and generators and to control the same are well known in the art and include one and two-way clutches, gearboxes and torque converters.

The device as described can be mounted without a tower. The overall size of the device is proportional to the diameter of the rotor and the additional cowling.

The device can also be disposed in a modular fashion allowing multiple units to be used in a common installation on a common turntable rotation system. In a modular installation with multiple units, anyone or more units may be easily removed for repair or maintenance, by means of an overhead crane and in any weather conditions, while leaving the balance of the units in place for production.

Although the device is inherently robust, in the event of very high wind speeds such as during tropical storms and hurricanes, the controller can angle the device partially or fully into or away from the wind by means of the motor driven turntable, in order to continue operating under these conditions and capture the maximum power of the device. Existing designs must be shut down in these conditions.

The present invention can also be adapted for use in natural watercourses. All of the internal aspects can be waterproofed with the rotor turned into or placed within the direction of water flow.

As part of an overall system of such turbines, it is an object of the present invention to be used and mounted in a wide range of locations and installations. For example, in a coastal area, the device as a wind turbine could be mounted on off-shore towers or barges and in on-shore installations including towers and buildings of different heights. The device can also be effectively used in the water where the possibility of a driving current exists.

BRIEF DESCRIPTION OF THE DRAWINGS

Embodiments of the present invention are explained, by way of example, and with reference to the accompanying drawings. The drawings illustrate only examples of embodiments of this invention and are therefore not to be considered limiting of its scope, as the invention may have other equally effective embodiments.

DETAILED DESCRIPTION

Figure 1:
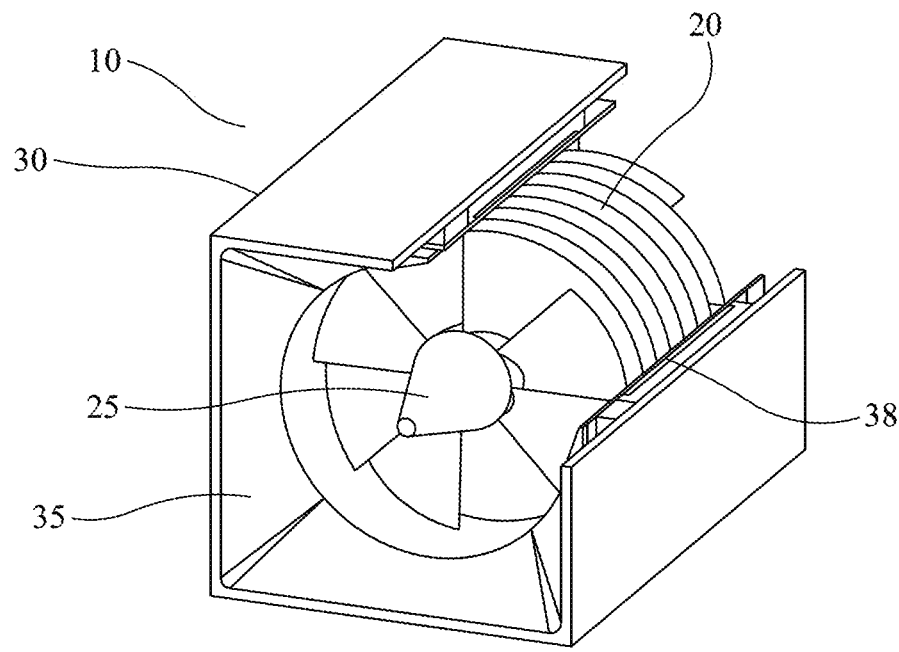
FIG. 1 illustrates a cut-away perspective view of a wind turbine according to the invention.

FIG. 1 shows a cut-away perspective view of the wind turbine 10 according to the invention. The invention has helical blades 20 around a co-axial spindle 25. The housing 30 also shows the intake cowling 35 which concentrates the intake airflow as a nozzle. The cut-away section shows the location of the helical blade support 38 and a co-axial flywheel 40. Everything within the helical blade support 38 comprises the rotor of the invention.

Figure 2:
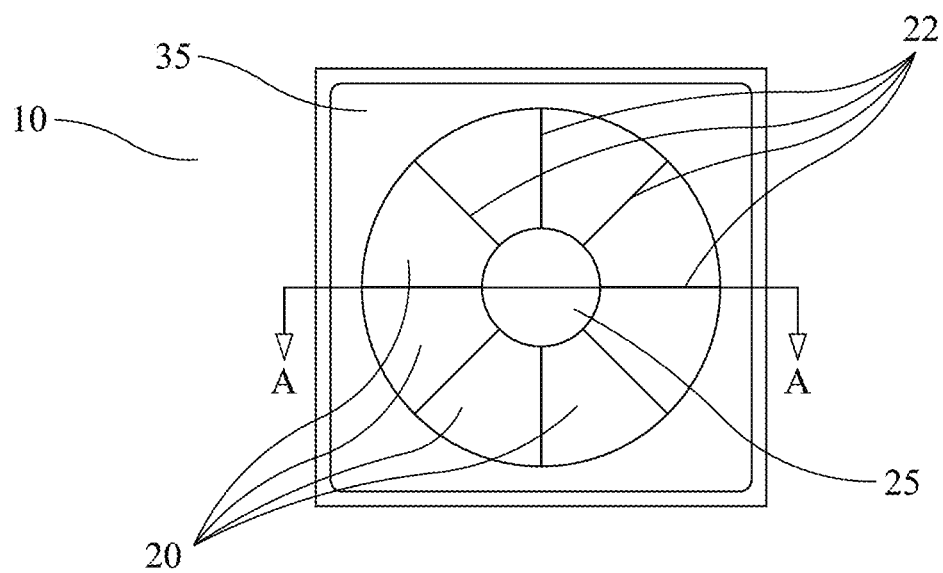
FIG. 2 illustrates a front-view of a wind turbine according to the invention.

FIG. 2 shows a front view of the wind turbine 10 according to the invention. The turbine shows the leading edges 22 of the helical blades 20 around a co-axial spindle 25. The intake cowling 35 concentrates the intake airflow as a nozzle and covers other equipment within the wind-turbine preventing the entry of dirt, animals and other detritus which would interfere with the windturbine.

Figure 3:
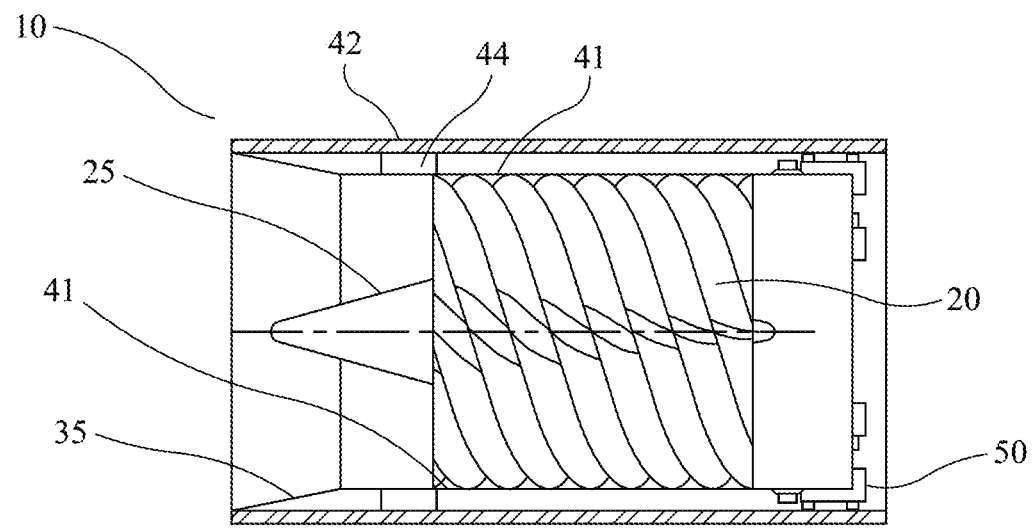
FIG. 3 illustrates a cross-sectional view of a wind turbine according to the invention across a section A-A from FIG. 2.

FIG. 3 shows a cross-sectional view of the wind-turbine 10 across the section A-A from FIG. 2. The wind turbine is turned so that the wind enters the wind turbine from the left and exits at the right. This shows the intake cowling 35 which concentrates the intake airflow as a nozzle, the helical blades 20 and the location of the co-axial flywheel 40. The figure also shows a co-axial spindle 25 designed to provide additional intake airflow concentration by being conical in shape with its largest end in the direction of the helical blades. The helical blades 20 rotate within the blade housing 41 which is, in turn separated from the outer housing 42 by suitably positioned guide rollers 44 or generator assemblies 50. Everything within the blade housing 41 acts as the rotor of the invention.

Figure 4:
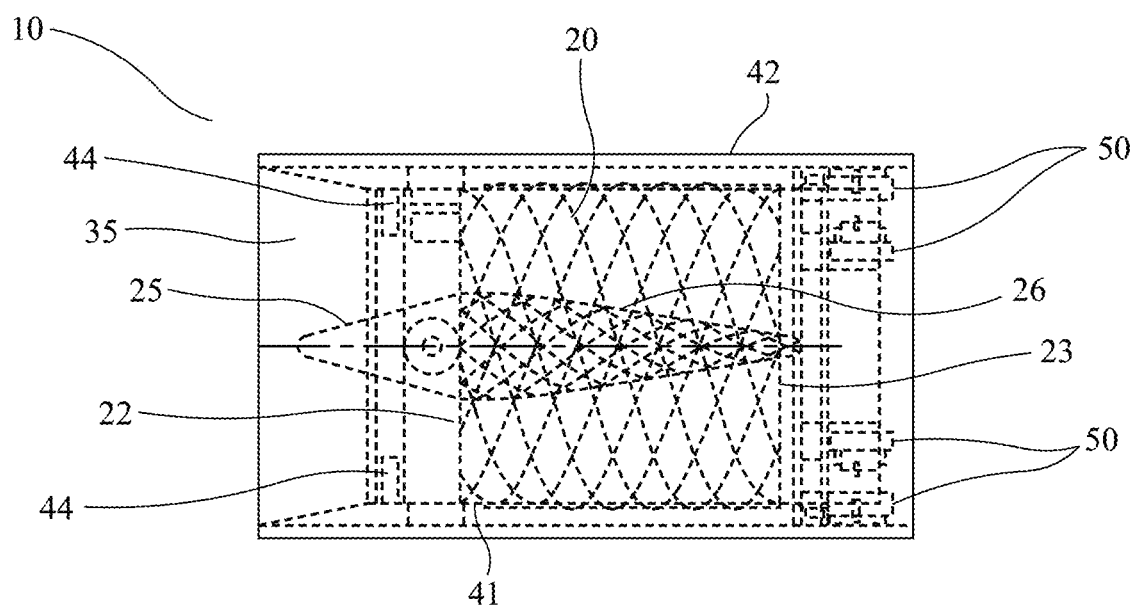
FIG. 4 illustrates a phantom view of the principal interior components of a wind turbine according to the invention in the same orientation as FIG. 3.

FIG. 4 shows a phantom view of the principal interior components of the wind turbine 10 in the same orientation as FIG. 3. All parts within the outer housing 42 are shown with dashed lines. The intake cowling 35 together with a co-axial spindle 25 concentrate the incoming airflow as a nozzle. The co-axial spindle 25 in this embodiment is also designed to have an exit portion 26 which decreases the air pressure acting as a diffuser from the point of the leading edges 22 of the helical blades 20 to their trailing edges 23. The helical blades 20 are attached to the exit portion 26 of the coaxial spindle 25 and, on their other side, the blade housing 41. The blade housing 41 acting as the rotor of the invention rotates by suitably positioned guide rollers 44 or generator assemblies 50. The blade housing 41 may also be mechanically engaged with a gearbox 60 which allows mechanical energy from the blade housing 41 to the flywheel 40 which is co-axial with and external to the blade housing 41 but within the outer housing 42 and separated from the outer housing 42 with friction reducing means.

Figure 5:
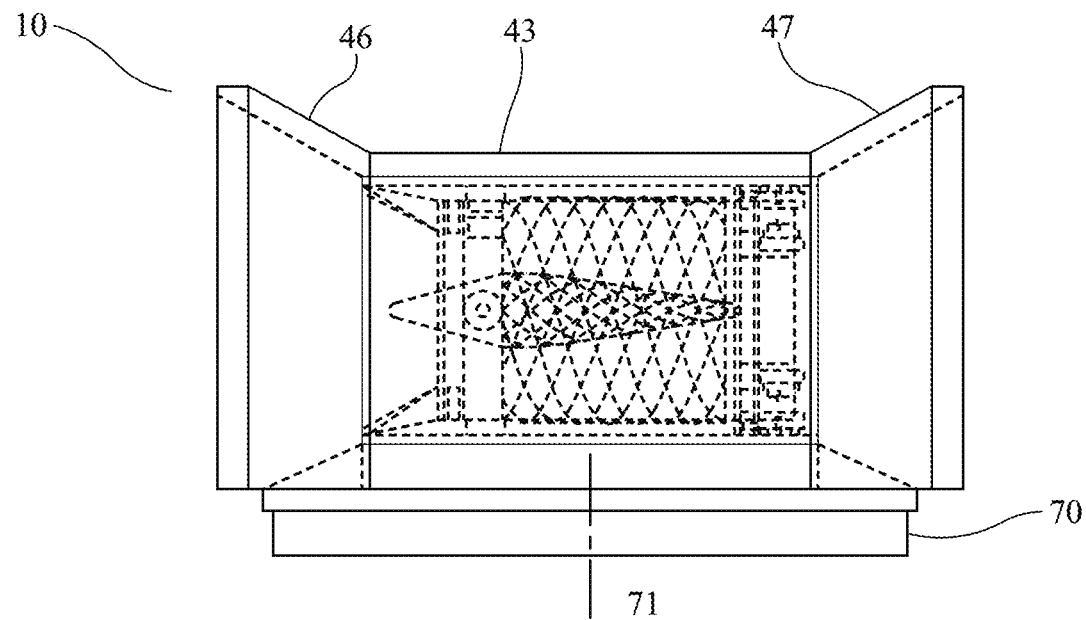
FIG. 5 illustrates a phantom view of a wind turbine according to the invention as in FIG. 4 with an alternate outer housing and situated on a turntable.

FIG. 5 is a phantom view of the principal interior components of a different embodiment of the invention. All parts within the alternate outer housing 43 are shown with dashed lines. The alternate embodiment of the invention is the wind turbine 10 with an alternate outer housing 43 which includes an extended intake cowling 46 and extended exit cowling 47. The wind turbine is turned on a mechanical turntable 70 so that the wind enters the wind turbine from the left and exits at the right. The mechanical turntable 70 can be powered by motors or other means and controlled by microcontrollers with input signals from vane anemometers and other techniques well known by those skilled in the art. The turntable 70 rotates about the centre line 71. The extended intake cowling 46 provides additional cross-sectional area to capture greater wind energy and acts as a nozzle. The extended exit cowling 47 lowers the pressure of the output airflow, increasing the speed of the air through the wind-turbine and acting as a diffuser.

Figure 6:
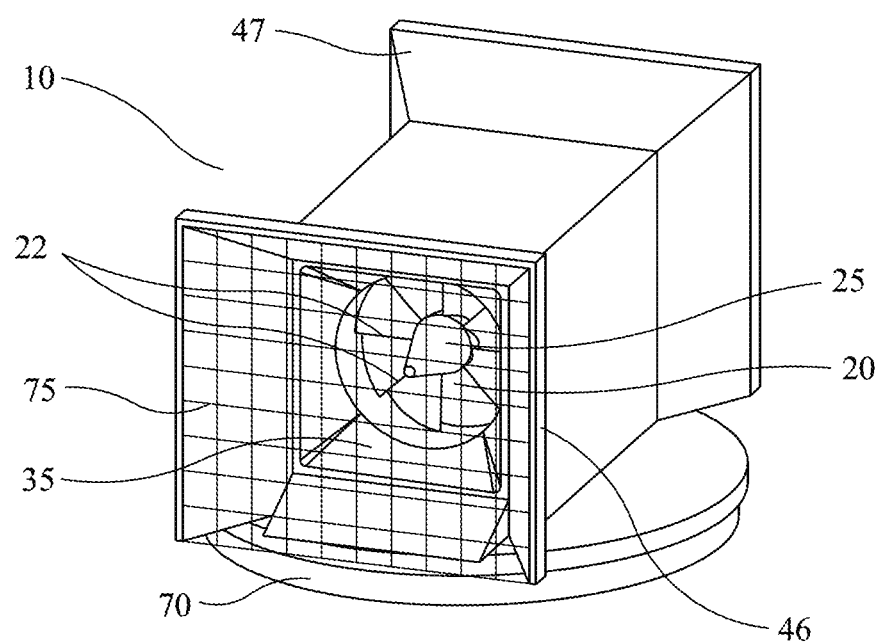
FIG. 6 illustrates a perspective view of a wind turbine according to the invention as illustrated in FIG. 5.

FIG. 6 shows the device of FIG. 5 in perspective view. Also shown is an optional mesh 75 placed at the entrance of the device and sized to prevent the entry of unwanted animals and objects and to act as a safety mechanism. This figure shows the wind turbine 10 which can be turned on a mechanical turntable 70 in order to place the opening into the wind. Also shown are the extended intake cowling 46 and the extended exit cowling 47. Inside the mesh can also be seen the co-axial spindle 25, the intake cowling 35, and the leading edges 22 of the helical blades 20.

Figure 7:
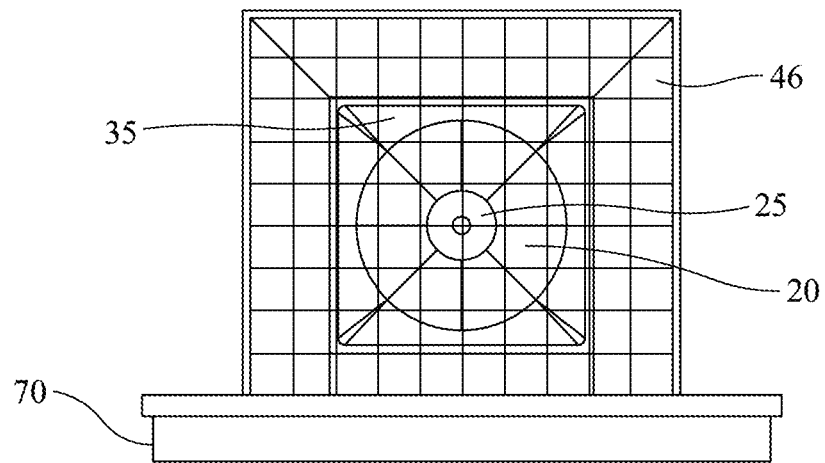
FIG. 7 illustrates a front view of a wind turbine according to the invention as illustrated in FIG. 5.

FIG. 7 shows the device of FIG. 6 in frontal view. This figure shows the extended intake cowling 46. The co-axial spindle 25, the intake cowling 35, and the helical blades 20 can also be seen. Also shown is the mechanical turntable 70.

Figure 8:
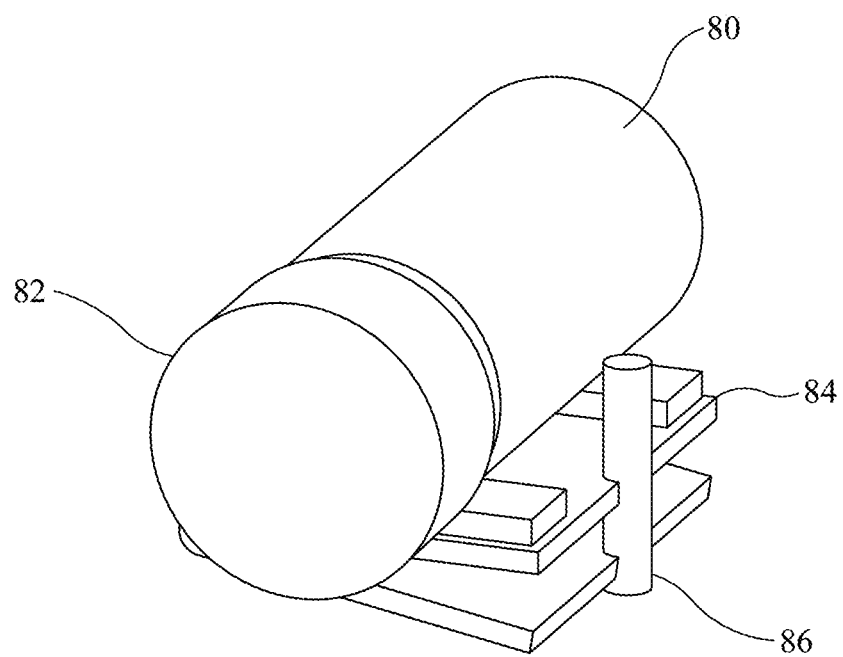
FIG. 8 illustrates a detailed schematic view of a generator assembly used in a wind turbine according to the invention.

FIG. 8 shows a schematic detail of a generator assembly. A generator or alternator 80 is mounted on a hinged base 84 and is directly connected to a friction wheel or gear 82. The friction wheel or gear 82 can be engaged with a suitable driving source by engaging the actuator 86 which allows the friction wheel or gear 82 to be engaged with a source of rotational energy. The output of the generator or alternator 80 are connected by means well known in the art to enable the production of electricity by engaging the generator assembly with the rotor of the invention.

Figure 9:
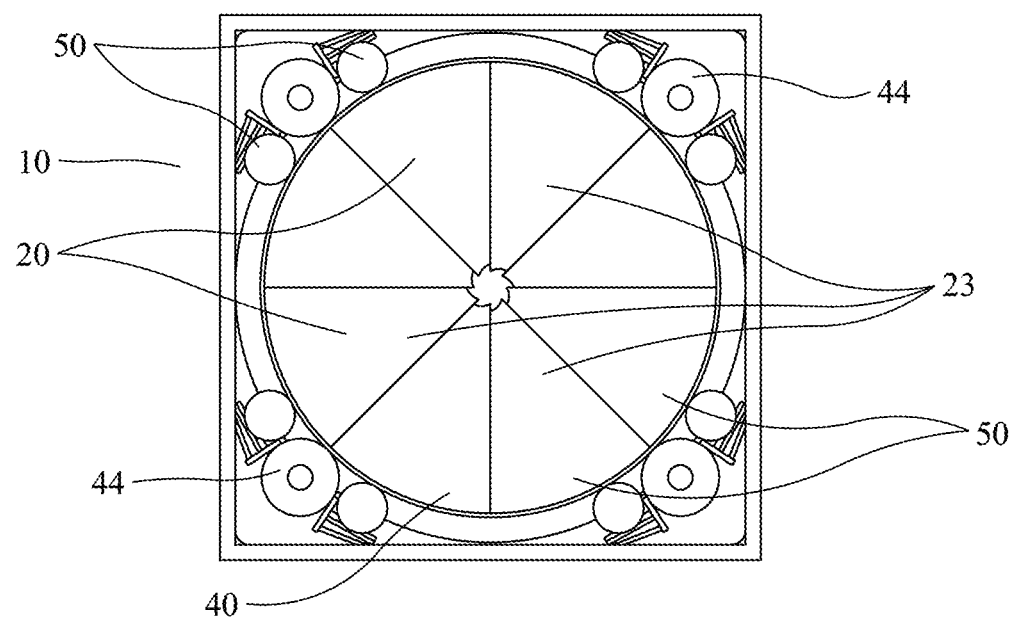
FIG. 9 illustrates a rear view of a wind turbine according to the invention as illustrated in any of the foregoing figures with the exit cowling removed in order to illustrate the disposition of the interior workings.

FIG. 9 shows a full rear view of the wind turbine 10 with the exit cowling removed. This figure shows the trailing edges 23 of the helical blades 20 within the blade housing 41 which are, in turn, supported by the guide rollers 44. All of the details within the blade housing 41 act as the rotor of the invention. Generator assemblies 50 can be engaged with the blade housing 41 acting as the rotor on an individual basis in accordance with a controller system which is well known by those who are skilled in the art. The said controller system would allow the engagement of generator assemblies with the blade housing 41 in proportion to the wind available.

Figure 10:
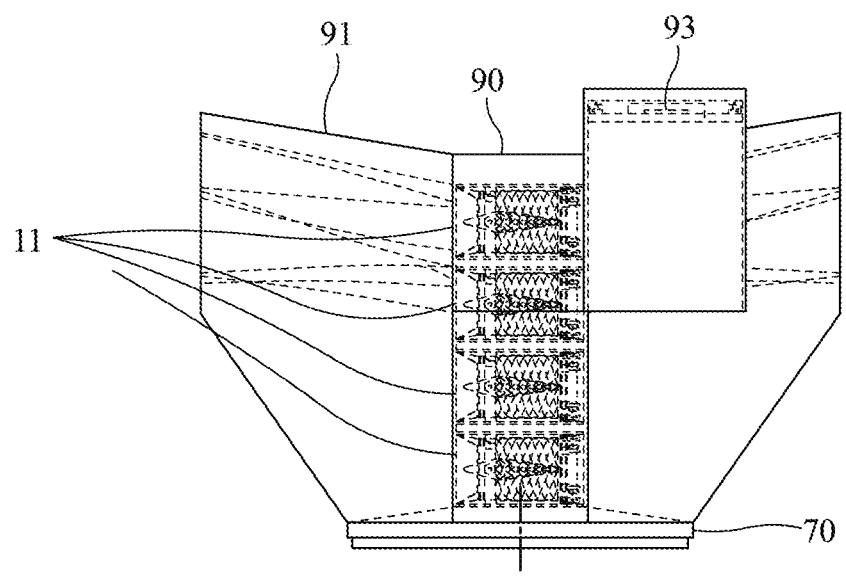
FIG. 10 illustrates a side phantom view of an alternate embodiment of the invention where multiple wind turbines are grouped together in a common housing with overhead crane for maintenance.

FIG. 10 shows an alternate embodiment of the invention where individual wind turbine units can be grouped together in order to maximize wind energy available at specific locations. Each individual wind-turbine unit 11 can be housed in an external housing 90 which has an extended intake cowling 91 disposed to concentrate wind energy available to all units in the grouping. An overhead crane 93 can be used for maintenance and removal of individual units. The overall assembly is located on an appropriately sized mechanical turntable 70.

Figure 11:
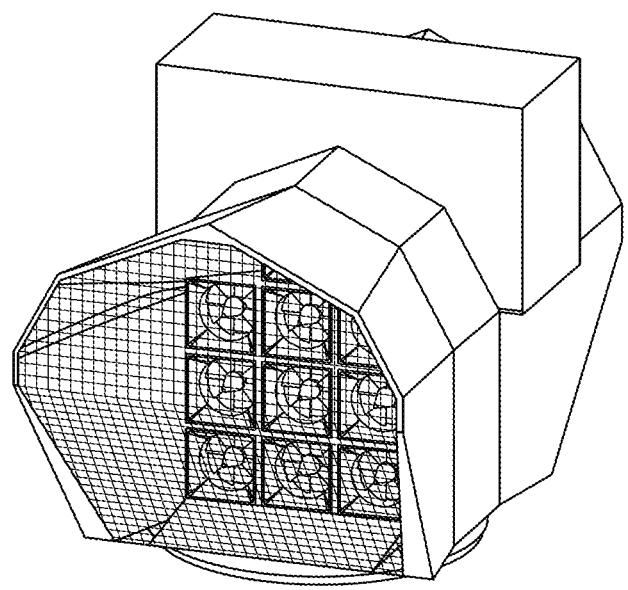
FIG. 11 illustrates a perspective view of the alternate embodiment of the invention of FIG. 10.

FIG. 11 shows a perspective view of the alternate embodiment of a grouping of individual wind turbine units illustrated in FIG. 10.

Figure 12:
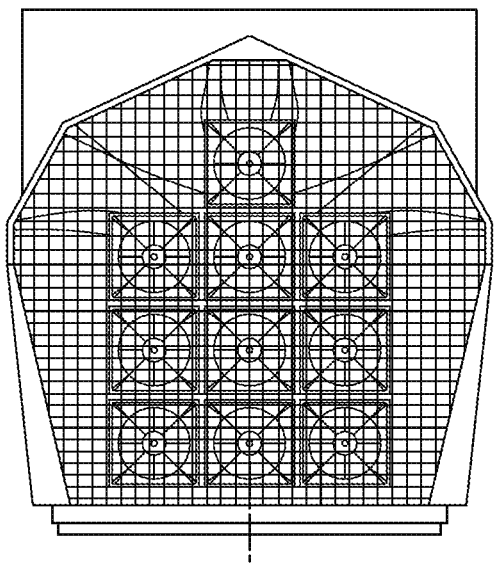
FIG. 12 illustrates a front view of the alternate embodiment of the invention of FIG. 10.

FIG. 12 shows a frontal view of the alternate embodiment of a grouping of individual wind turbine units illustrated in FIG. 10.

Figure 13:
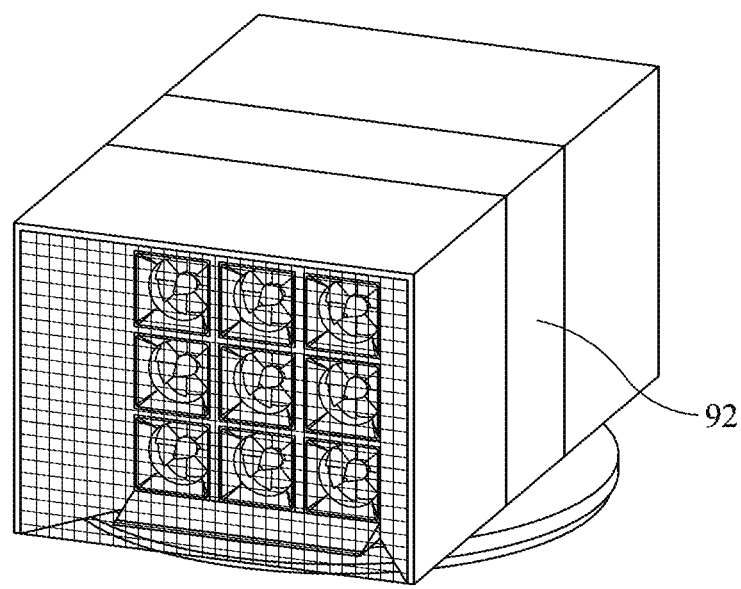
FIG. 13 illustrates a perspective view of another alternate embodiment of the invention where a different grouping of multiple wind turbines are grouped together in a common housing.

FIG. 13 shows a perspective view of an alternate embodiment of the invention where multiple wind turbine units according to the invention are grouped together in an alternate external housing 92.

Figure 14:
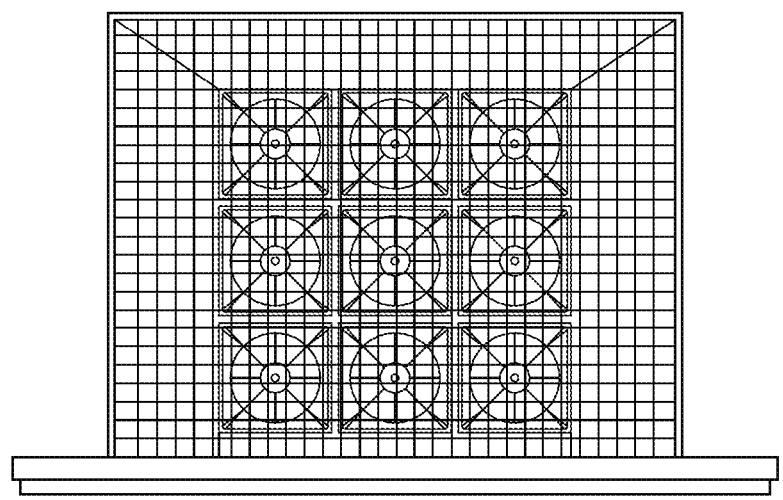
FIG. 14 illustrates a front view of the alternate embodiment of the invention of FIG. 13.

FIG. 14 is a frontal view of the alternate embodiment of the invention shown in FIG. 13.

Figure 15:
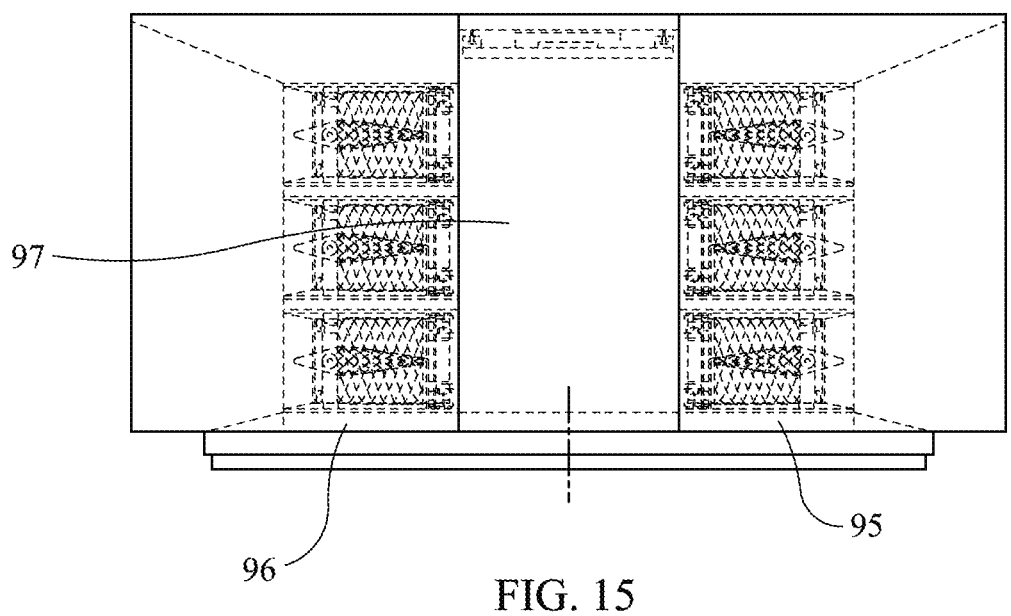
FIG. 15 illustrates a side phantom view of the alternate embodiment of the invention of FIG. 13 showing that wind turbines can also be grouped in a disposition where the outlet ports of one set of wind-turbines can feed the intake ports of additional wind turbines all within a common housing.

FIG. 15 is a side phantom view of the alternate embodiment of the invention shown in FIG. 13 where the dashed lines represent the principal components of the invention within the external housing. The figure illustrates that a second set of wind turbine units 95 can be placed behind a first set of wind turbine units 96 in order to ensure all wind energy available is converted within the invention. The space 97 between the two sets of wind turbine units is shaped and provided in a fashion that maximizes the diffuser effects for the first set of wind turbine units 96 and the nozzle effects for the second set of wind turbine units 95.

Figure 16:
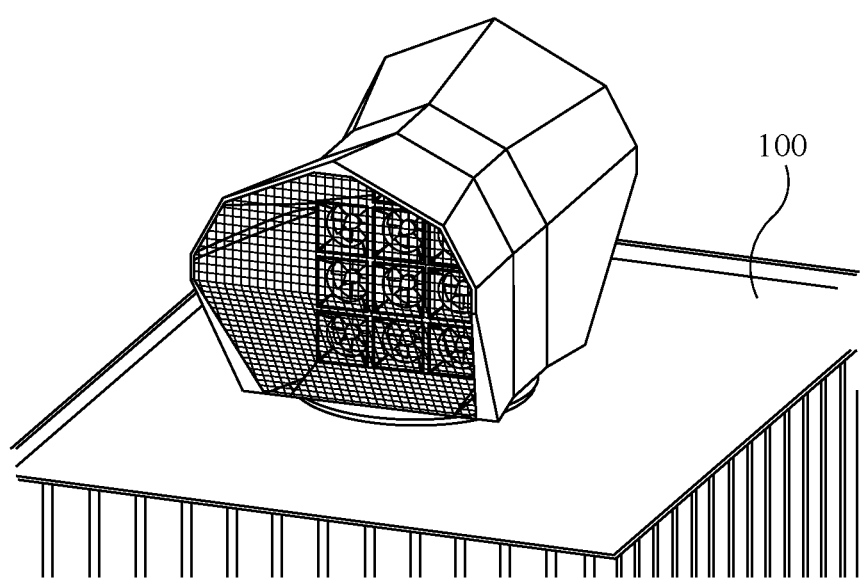
FIG. 16 illustrates the wind-turbine of FIGS. 10, 11 and 12 situated on top of the roof of a building.

FIG. 16 shows the embodiments of the invention illustrated in FIGS. 10, 11 and 12, located on a building 100. The building is not shown as part of the invention but only to illustrate the present invention can be easily located on the top of a building with suitable mechanical connection and control means well known to those skilled in the art.

Figure 17:
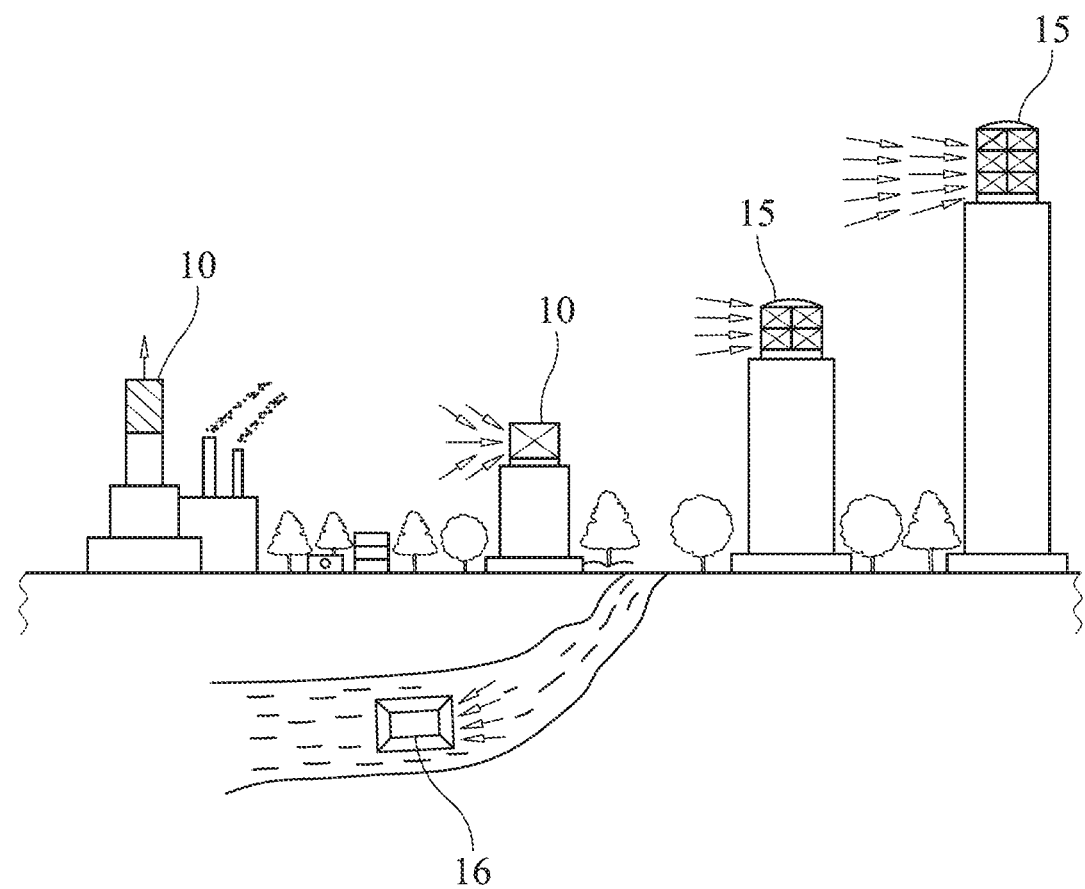
FIG. 17 illustrates the invention of FIGS. 10, 11 and 12 situated in many types of land based installations.

FIG. 17 shows embodiments of the invention illustrated in FIGS. 10, 11 and 12 located on different structures in land based applications. The installations shown are specifically a vertical installation and a run of river installation. The structures are not shown as part of the invention but only to illustrate how the present can be easily located on various structures. Wind turbines 10 can be located on towers or buildings. Groupings of turbines 15 as in any of FIGS. 10 to 15 can also be mounted on buildings of different heights. Turbines 16 powered from water currents can also be installed.

Figure 18:
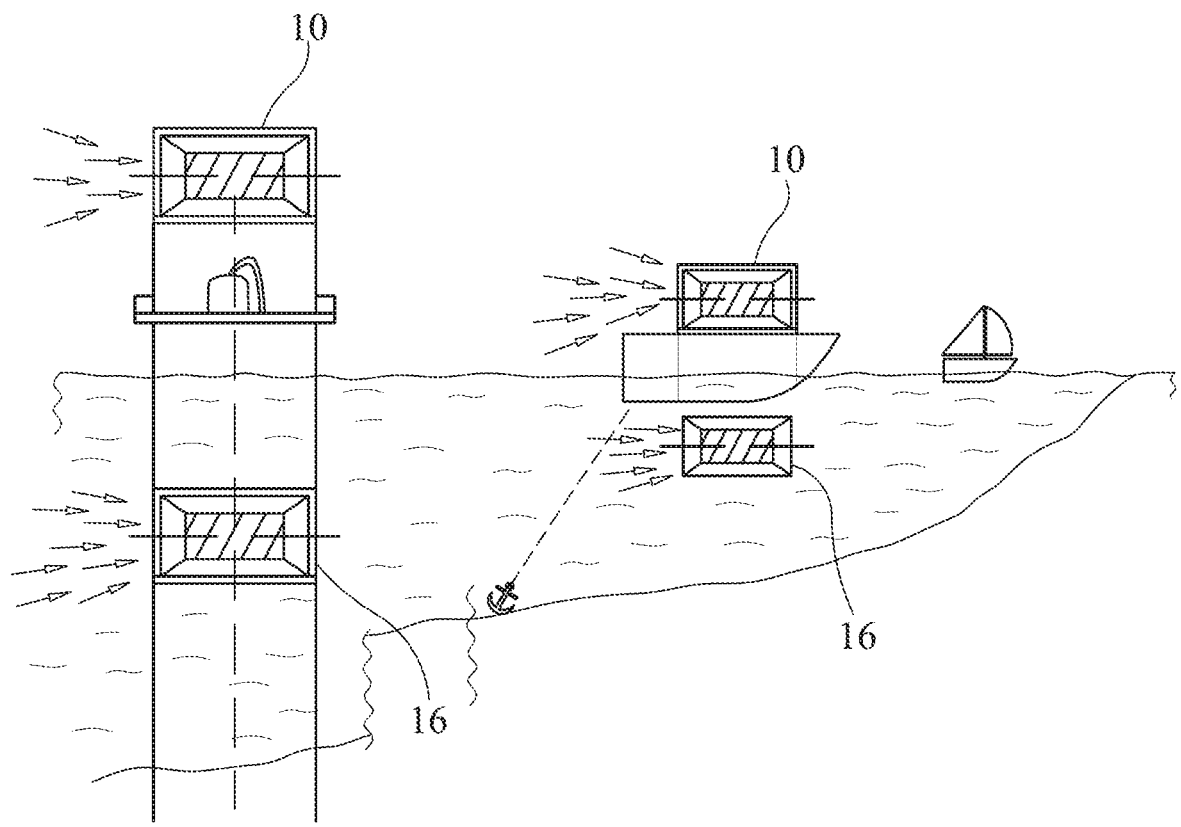
FIG. 18 illustrates the invention of FIGS. 10, 11 and 12 situated in off shore based installations.

FIG. 18 shows embodiments of the invention illustrated in FIGS. 10, 11 and 12 located on different structures in an off shore based installation. The structures are not shown as part of the invention but only to illustrate how the present can be easily located on various structures. Wind turbines 10, or grouping of turbines 15 as in any of the FIGS. 10 to 15, can be located on off-shore towers or barges. Turbines 16 powered from water currents can also be installed.

Figure 19:
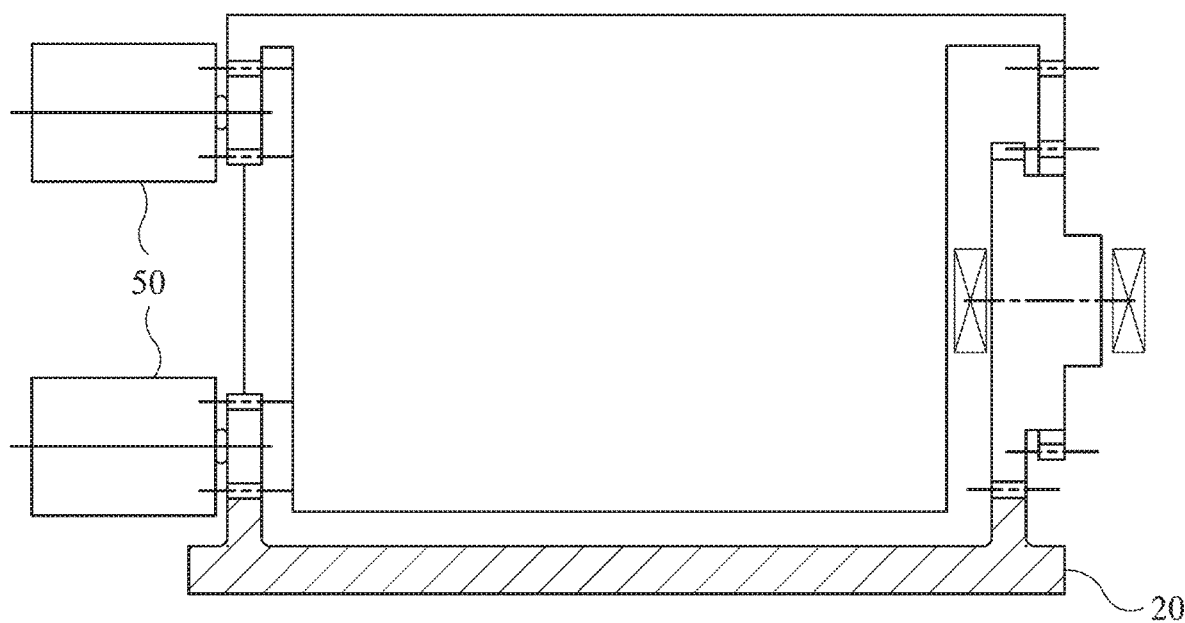
FIG. 19 is a schematic of a flywheel interruptible clutch arrangement.

FIG. 19 shows a schematic of a portion of the invention having a flywheel interruptible clutch arrangement for use in light wind conditions. One or more of the generators 50 are placed in mechanical connection with the rotor 20 to generate electricity. The cross-hatched areas show those portions of the invention being powered.

Figure 20:
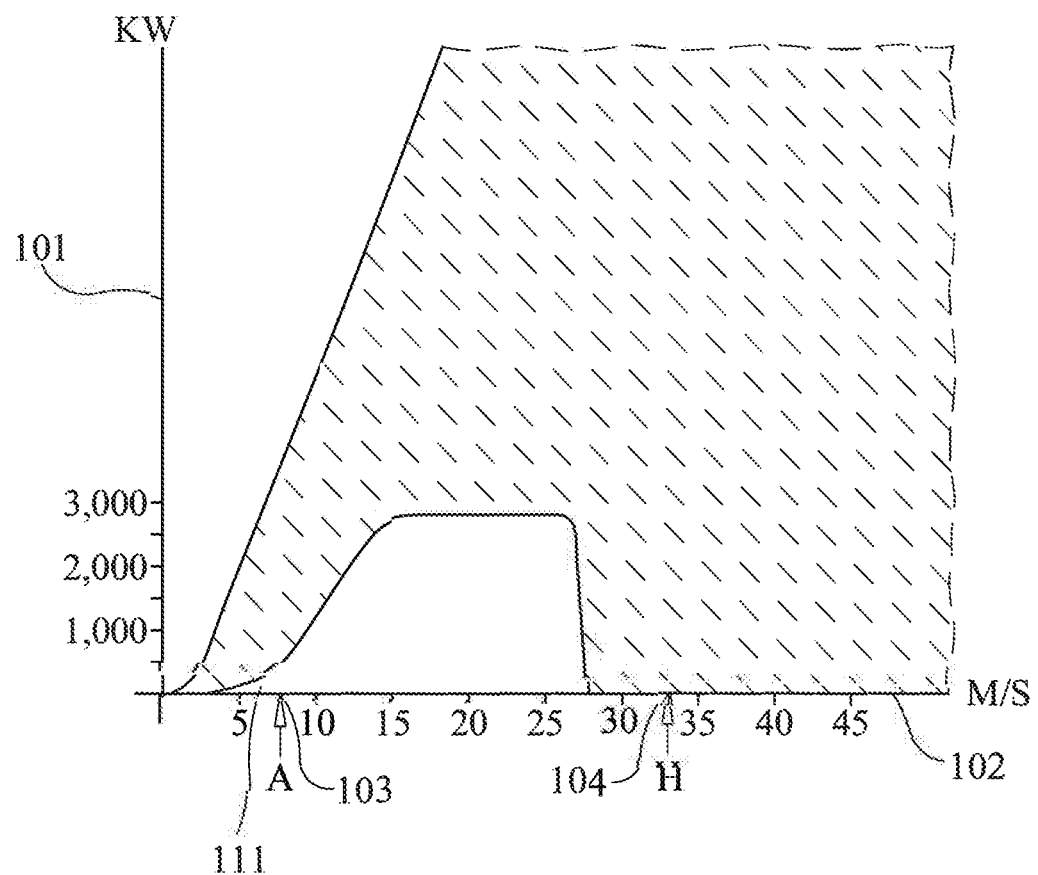
FIG. 20 is a graph showing potential power available versus wind speed comparing the invention and two traditional wind turbines.

FIG. 20 is a graph showing potential power 101 versus wind speed in metres per second 102. Average Canadian wind speed 103 of 7.5 m/s is shown as are hurricane force winds 104. The potential power which can be attained by the invention does not have the same limitations of a three blade turbine unit that cannot operate efficiently at low speed 11 or in high wind, need to shut down to avoid destruction. The cross hatched area is the wind potential that can be utilized by the invention.

What I claim is:

1. A wind turbine comprising:
 a housing having a flat base, an open inlet end and an open exit end;
 a freely rotatable drum-style rotor disposed within the housing, the freely rotatable drum-style rotor having a first open end and a second open end, the freely rotatable drum-style rotor having an inlet at the first open end for funneling air into the rotor and an outlet at the second open end to direct air away from the rotor, wherein the inlet of the freely rotatable drum-style rotor is aligned with the open inlet end of the housing, and wherein the outlet of the freely rotatable drum-style rotor is aligned with the open exit end of the housing;
 one or more blades disposed within and connected to the drum-style rotor and co-axial therewith whereby the passage of air through the rotor induces the rotor to rotate about its axis, wherein the one or more blades are arranged around a conical-shaped spindle co-axial with the rotor;

mechanical means to direct the rotor into the direction of the wind, wherein the mechanical means comprises a plurality of contact bearings, air bearings or magnetic bearings;

means to interruptibly connect one or more of a plurality of generators to the rotor on the rotor's circumference in order to generate electricity;

flywheel storage means disposed within the housing, the flywheel storage means interruptibly connected with the rotor and interruptibly connected with one or more of the plurality of generators; and control means to maximize electrical output of the wind turbine under different operating conditions, the control means controlling the connection of the flywheel storage means to the rotor, the connection of one or more of the plurality of generators to the flywheel storage means, and the mechanical means.

2. The wind turbine of claim 1 wherein the one or more blades are screwlike blades.

3. The wind turbine of claim 1 wherein the one or more blades are fanlike blades.

4. The wind turbine of claim 1 wherein the wind turbine further comprises a diffuser following the outlet end of the rotor.

5. The wind turbine of claim 1 wherein the wind turbine further comprises a nozzle preceding the inlet of the rotor.

6. The wind turbine of claim 1 wherein the wind turbine further comprises:
   a diffuser following the outlet end of the rotor; and
   a nozzle preceding the inlet of the rotor.

7. The wind turbine of claim 1 wherein the turbine is built in a modular style to allow the use of the wind turbine with one or more other like wind turbines and a means to direct the one or more other like wind turbines into or out of the wind.

8. The wind turbine of claim 1, wherein the conical-shaped spindle is designed to provide additional intake airflow concentration by being conical in shape with its largest end in the direction of the one or more blades.

9. The wind turbine of claim 1, wherein the conical-shaped spindle is designed in a manner to concentrate incoming airflow as a nozzle.

10. The wind turbine of claim 1, wherein the conical-shaped spindle comprises an exit portion which decreases the air pressure acting as a diffuser from leading edges of the one or more blades to trailing edges of the one or more blades.

11. The wind turbine of claim 1, wherein a controller engages the one or more of the plurality of generators with the rotor on an individual basis in proportion to the wind available.

12. A modular wind turbine comprising:
   a polygonal housing comprising a flat base, an open housing inlet end, and an open housing exit end, the open housing exit end being opposite the open housing inlet end, wherein the housing is shaped to allow a plurality of the housings to be used in a stacked modular fashion,
   a freely rotatable drum style rotor horizontally mounted within the housings, the rotor open at both ends with a rotor inlet end for funneling air into the rotor and a rotor exit end opposite the rotor inlet end to direct air away from the rotor, and wherein the rotor inlet end and the rotor exit end are aligned with the open housing inlet end and the open housing exit end respectively;
   one or more blades disposed within and connected to the rotor and coaxial therewith whereby the passage of air through the rotor induces the rotor to rotate about its axis,
   an inlet cowling within the housing and located at the open housing inlet end to concentrate air as a nozzle and direct the concentrated air into the rotor;
   an exit cowling within the housing and located at the open housing exit end to act as a diffuser receiving the exit air from the rotor;
   a plurality of generators interruptibly connecter with the rotor and located on the periphery of the rotor within the housing in order to generate electricity;
   a flywheel co-axial with the rotor and located within the rotor and located on the periphery of the rotor within the housing in order to generate electricity;
   a motor driven turntable on which the flat base of the housing is placed which allows the wind turbine to be directed into or out the wind; and
   a controller which measures speed and direction of the wind and which controls the motor driven turntable, the interruptible connections between the to and the plurality of generators, and the interruptible connection between the rotor and the flywheel to maximize the electrical output of the wind turbine under different operating conditions.

13. The modular wind turbine of claim 12 wherein the one or more blades are screwlike blades or fanlike blades.

14. The modular wind turbine of claim 12 wherein the turbine is used with one or more other like wind turbines and the motor driven turntable directs the one or more other like wind turbines into or out of the wind.

15. The modular turbine of claim 12 wherein one or more of the plurality of generators located on the periphery of the rotor, when operated as a driver, converts electricity into rotational energy.

16. The modular wind turbine of claim 15 wherein the turbine is used with one or more other like wind turbines and the motorized turntable means directs the one or more other like wind turbines during the flow of the at least one of the liquid and the gas.

17. A turbine for the generation of electricity comprising:
   a housing comprising a flat base, an open inlet end and an open exit end;
   drum style rotor means disposed within the housing, the rotor means comprising one or more blades located within and connected to the rotor means, the one or more blades disposed to convert the flow of at least one of a liquid and a gas through the rotor means into rotation of the rotor means and oriented such that the rotor means is aligned with the open inlet end and the open exit end;
   one or more generator means disposed within the housing and located on the periphery of the rotor means, the one or more generator means interruptibly connected with the rotor means to generate electricity;
   flywheel means disposed within the housing and co-axial with the rotor means to store rotational energy from at least one of the rotor means and the generator means;
   two-way clutching means disposed within the housing to interruptibly connect the rotor means and the flywheel means to transfer rotational energy from one to the other for at least one of storing and using the transferred rotational energy;
   motorized turntable means to direct the turbine during the flow of at least one of the liquid and the gas; and controller means to control the turntable means and the two-way clutching means in order to maximize the electrical output of the turbine under different operating conditions.

18. The turbine of claim 17 wherein the one or more blades are screwlike blades or fanlike blades.

19. The turbine of claim 17, wherein a controller engages the one or more generator means with the drum style rotor means on an individual basis in proportion to the wind available.

* * * * *